United States Patent [19]

Delmege et al.

[11] Patent Number: 4,502,109
[45] Date of Patent: Feb. 26, 1985

[54] APPARATUS FOR ESTIMATING PLURAL SYSTEM VARIABLES BASED UPON A SINGLE MEASURED SYSTEM VARIABLE AND A MATHEMATICAL SYSTEM MODEL

[75] Inventors: Arthur H. Delmege, Detroit; Yehia M. El-Ibiary, Troy; Melvin A. Rode, W. Bloomfield; Lael B. Taplin, Union Lake, all of Mich.

[73] Assignee: Vickers, Incorporated, Troy, Mich.

[21] Appl. No.: 418,086

[22] Filed: Sep. 14, 1982

[51] Int. Cl.³ .................. G05B 15/00; G05D 3/00
[52] U.S. Cl. .................. 364/174; 364/149
[58] Field of Search ............ 364/174, 175, 149–151, 364/178

[56] References Cited

U.S. PATENT DOCUMENTS

| | | | |
|---|---|---|---|
| 3,673,395 | 6/1972 | Tripp | 364/174 X |
| 3,967,515 | 7/1976 | Nachtigal et al. | 364/174 X |
| 4,164,167 | 8/1979 | Imai et al. | 91/363 R |
| 4,243,923 | 1/1981 | Whitney et al. | 318/561 |
| 4,262,336 | 4/1981 | Pritchard | 364/474 |
| 4,396,975 | 8/1983 | Kurakake | 364/174 X |

FOREIGN PATENT DOCUMENTS 1523552  4/1969  Fed. Rep. of Germany.
1566437  4/1980  United Kingdom.

OTHER PUBLICATIONS

Lindorff, *Theory of Sampled-Data Control Systems*, Ch. 7, "Introduction to State Variables", (1965), pp. 191–219.

Merritt, *Hydraulic Control Systems*, (1967), pp. 294–310.
Wierschem, "Positioning Control of Weakly-Damped Drive Systems by State Feedback", Regelungstechnik, (1981), pp. 11–19, (w/translation).

*Primary Examiner*—Jerry Smith
*Assistant Examiner*—Allen MacDonald
*Attorney, Agent, or Firm*—Barnes, Kisselle, Raisch, Choate, Whittemore & Hulbert

[57] ABSTRACT

An electro-hydraulic servo control system which includes a servo actuator adapted to variably position a load mass, and an actuator control system which includes a sensor coupled to the actuator for providing an indication of measured actuator position and a digital observer responsive to measured actuator position for estimating velocity and acceleration at the actuator. Signals indicative of measured actuator position, estimated velocity and estimated acceleration are fed to a comparator, together with a position command signal, for obtaining a difference or error signal to provide a control input to the actuator. The observer electronics includes digital computation means suitably programmed to estimate position, velocity and acceleration as solutions to three linear equations with three unknowns. Equation constants, which are functions of actuator and driven mass physical characteristics, are entered through operator-adjustable resistors. The actuator position and error input signals are periodically sampled and stored as inputs to the observer electronics. The observer electronics also embodies a self-test feature to facilitate maintenance in the field.

11 Claims, 6 Drawing Figures

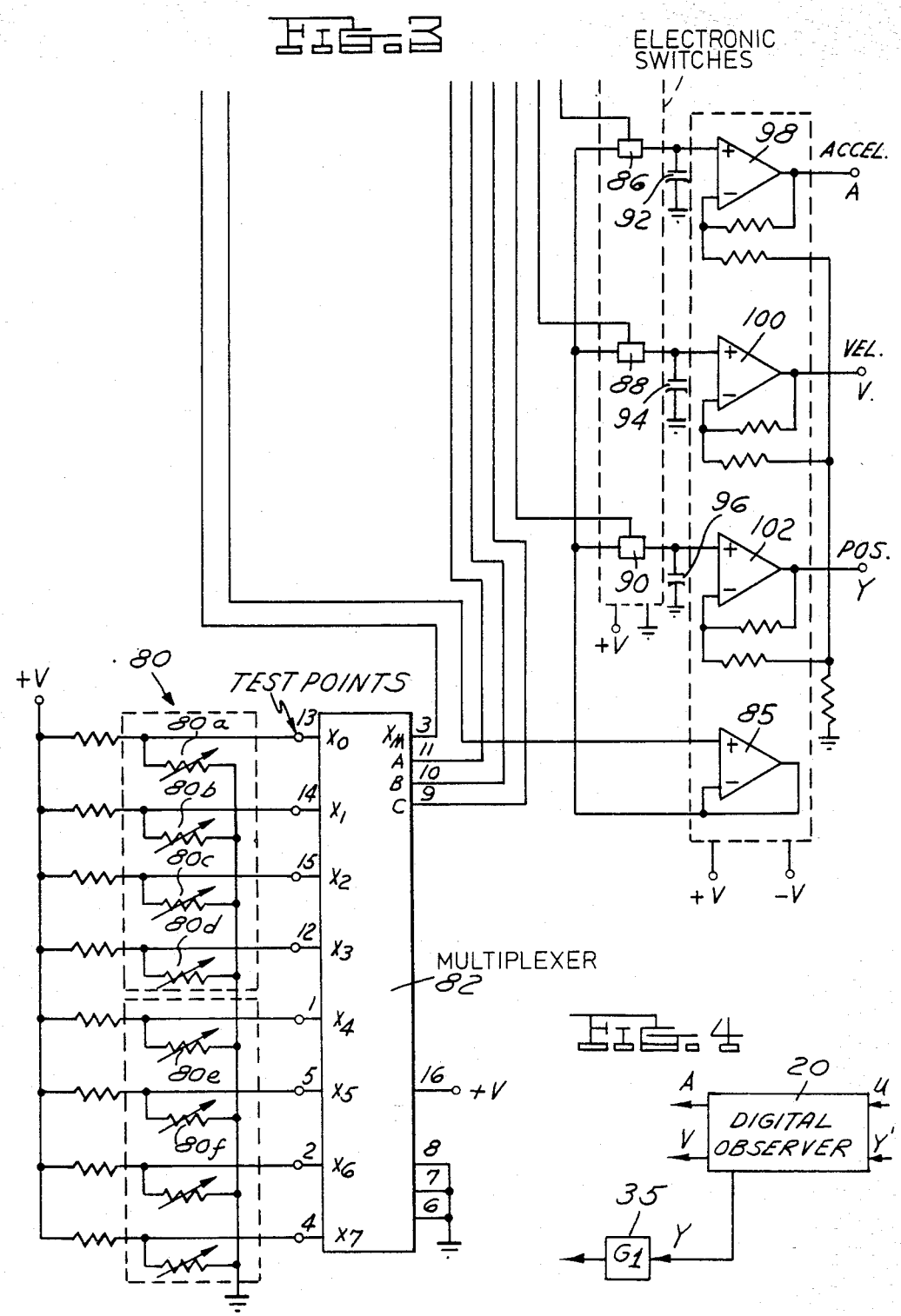

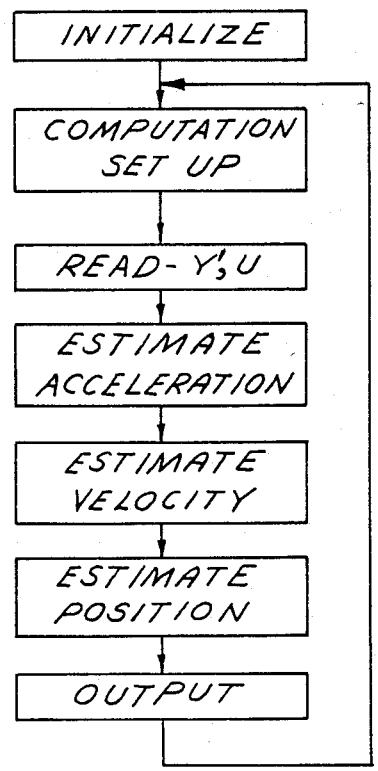
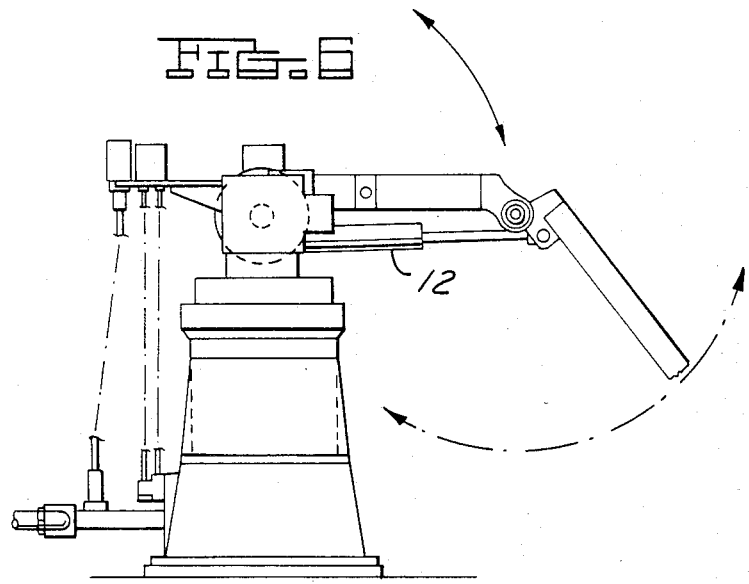

APPARATUS FOR ESTIMATING PLURAL SYSTEM VARIABLES BASED UPON A SINGLE MEASURED SYSTEM VARIABLE AND A MATHEMATICAL SYSTEM MODEL

The present invention relates to power transmissions, and more particularly to power servo control systems e.g. electric, electro-pneumatic and/or electro-hydraulic servo control systems.

BACKGROUND OF THE INVENTION

It is conventional practice in the art of electro-hydraulic servo control systems to provide a command signal indicative of position desired at the controlled mechanism, to measure actual position, velocity and acceleration of the controlled mechanism by means of corresponding transducers, and to drive a hydraulic actuator with an error signal representative of a difference between the command signal and the measured motion variables. Provision of three transducers mounted on or otherwise responsive to the controlled mechanism increases significantly the overall expense of the servo system while at the same time reducing overall reliability. The aforementioned deficiencies in the art are particularly acute in the field of industrial robotics where interest in cost, simplicity and reliability is continually increasing.

Barker, "Design of a State Observer For Improving the Response of a Linear Pneumatic Servo-Actuator," *Fluids in Control and Automation*, Paper C5 (1976) discusses design theory for an observer for estimating unmeasurable state variables in a pneumatic servo-actuated guidance control system. In addition to a mathematical analysis of the first order system state functions and eigenvalue assignment theory, the paper discloses a specific analog observer control system wherein a pneumatic servo actuator is controlled as a combined function of the actuator command signal, measured actuator position, and actuator velocity and acceleration estimated by the observer.

OBJECTS AND SUMMARY OF THE INVENTION

A general object of the present invention, therefore, is to provide a servo control system, specifically an electro-hydraulic servo control system, which is less expensive and more reliable than are the prior art systems of the type hereinabove discussed.

Another object of the present invention is to provide a servo control system adapted for general application in the electro-hydraulic field, and which may be readily adapted or programmed for specific hydraulic servo control applications.

A further object of the invention is to provide an electro-hydraulic servo control system which addresses the foregoing objects and which finds particular application in the field of manipulator control as in industrial robotics and mobile equipment such as front-end loaders and excavators, etc.

In accordance with the present invention, the foregoing and other objects are achieved by providing a servo actuator and control system which includes a sensor or transducer for actually measuring only one dynamic motion variable at the actuator, and observer electronics for estimating the remaining desired state variables as a function of a mathematical model of dynamic behavior characteristics of the actuator and driven mass.

In a preferred embodiment of the invention herein disclosed, actuator position is measured using a suitable sensor, and actuator velocity and acceleration are estimated based upon the actuator position signal and the input signal to the actuator, which is preferably an electro-hydraulic actuator. The resulting signals indicative of measured position, and estimated velocity and acceleration, are compared with a position command signal to provide a difference or error signal to be fed as the control input to the actuator.

Most preferably, the observer electronics take the form of digital computation means suitably designed or programmed to estimate position, velocity and acceleration as solutions to three corresponding linear equations with three unknowns. Equation constants, which are a function of actuator and driven mass physical characteristics, are preferably entered through operator-variable impedances, such as adjustable resistors. The measured actuator position and actuator input error signals are periodically sampled and stored as variable inputs to the observer electronics. The preferred embodiment of observer electronics herein disclosed also embodies a self-test feature to facilitate maintenance in the field.

The use of only one rather than multiple transducers and sensors responsive to actuator/mass motion reduces significantly the cost and complexity of the overall system, and also increases overall system reliability. Overall system reliability is improved, particularly as applied to noisy environments and/or noisy sensors, by obtaining velocity and acceleration signals electronically rather than directly. Another important advantage of the invention is the ability to estimate an otherwise difficult to measure essentially inaccessible state variable. One example of such a variable in manipulator applications is motion at the end of a flexible arm or the like. The observer may be readily programmed with a mathematical model of the flexible arm.

BRIEF DESCRIPTION OF THE DRAWINGS

The invention, together with additional objects, features and advantages thereof, will be best understood from the following description, the appended claims and the accompanying drawings in which:

FIGS. 2 and 3 together comprise an electrical schematic drawing of the digital observer electronics package illustrated in block form in FIG. 1;

FIG. 4 is a fragmentary functional block diagram showing a modified embodiment of the servo control system of FIG. 1;

FIG. 5 is a flow diagram useful in understanding operation of the invention; and FIG. 6 is a fragmentary diagram of a robot manipulator arm in connection with which the electro-hydraulic servo control system of the present invention finds particular utility.

DETAILED DESCRIPTION OF PREFERRED EMBODIMENTS

Figure 1:
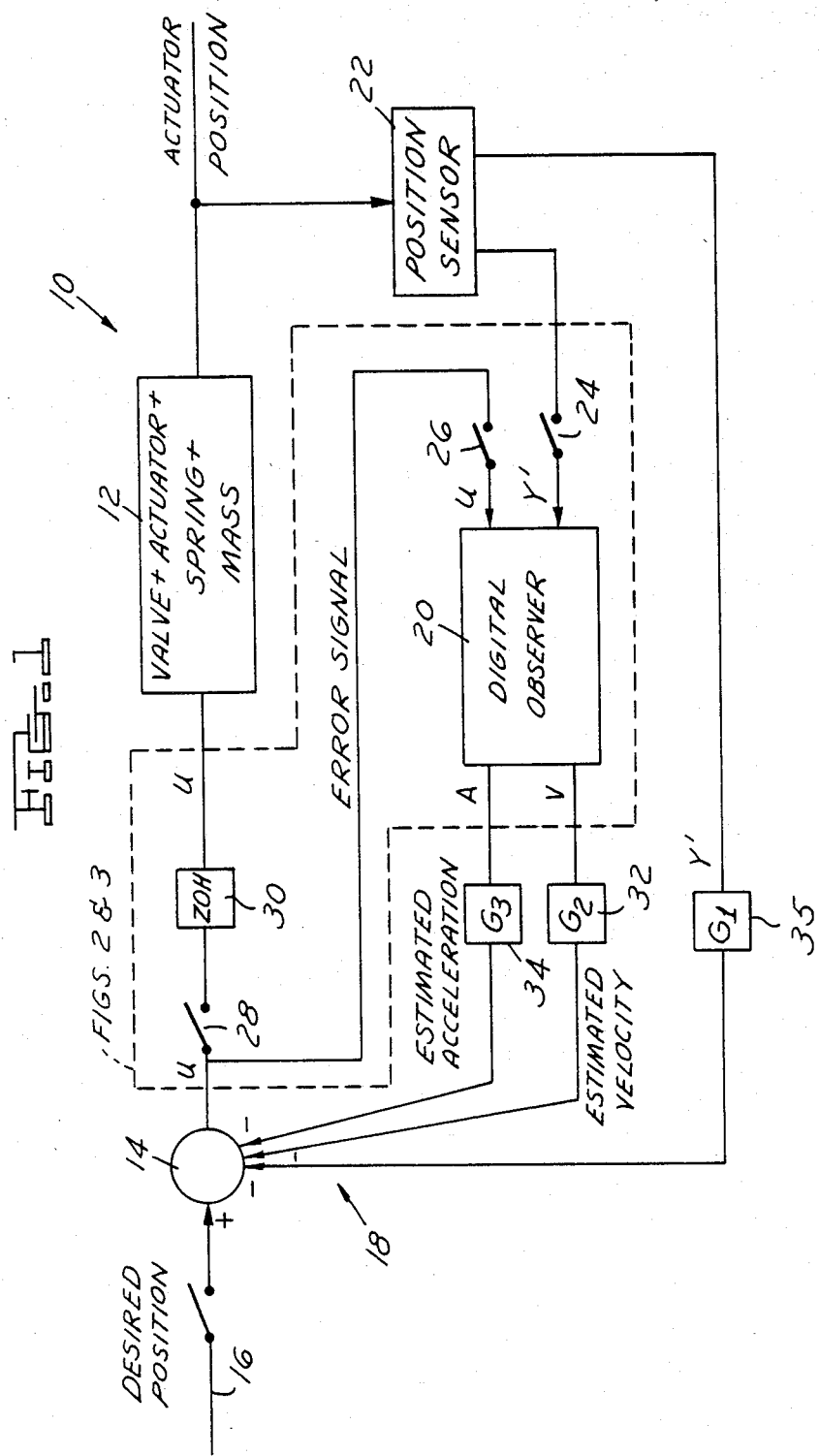
FIG. 1 is a functional block diagram of an electro-hydraulic servo control system in accordance with a presently preferred embodiment of the invention.

FIG. 1 illustrates a presently preferred embodiment 10 of an electro-hydraulic servo control system in accordance with the present invention as comprising a hydraulic actuator 12 of conventional construction. Actuator 12 would typically include a valve with a force motor which receives an electrical input control signal and applies hydraulic fluid to a spool, which in turn controls flow of fluid to an actuator mechanism that moves a load mass. A summation amplifier 14, which typically comprises a number of differential amplifiers, receives a position command signal on the line 16 from an external source (not shown) such as a potentiometer, a suitably programmed computer or a tape control mechanism, etc., and provides a control signal as the input to actuator 12 as a function of a comparison between the position command signal and the feedback signals on the lines 18 which are indicative of dynamic response at the actuator. Specifically, amplifier 14 receives signals indicative of position, velocity and acceleration at the actuator, and provides an input control signal to the actuator mechanism as a function of comparison between such dynamic motion-variable signals and the command signal.

In accordance with the present invention, at least some of the dynamic variable signals indicative of actuator motion fed to amplifier 14 are estimated by a digital observer 20 as a function of a mathematical model of dynamic behavior characteristics at the actuator. More specifically, a position sensor 22, which may comprise a variable resistor, a proximity transducer or the like, provides a signal Y' indicative of actuator position through a sampling switch 24 to observer 20. Likewise, the difference or error signal U at the output of amplifier 14 is fed through a sampling switch 26 as a second input to observer 20. Error signal U is also fed through a sampling switch 28 to a zero order hold amplifier 30, and thence to actuator 12. Observer 20 estimates velocity and acceleration at the actuator in a manner to be decribed hereinafter, and provides corresponding velocity and acceleration signals V and A to amplifier 14 through the respective gain blocks 32, 34. The signal Y' indicative of measured actuator position is fed from position sensor 22 through a gain block 35 to amplifier 14.

Figure 2:
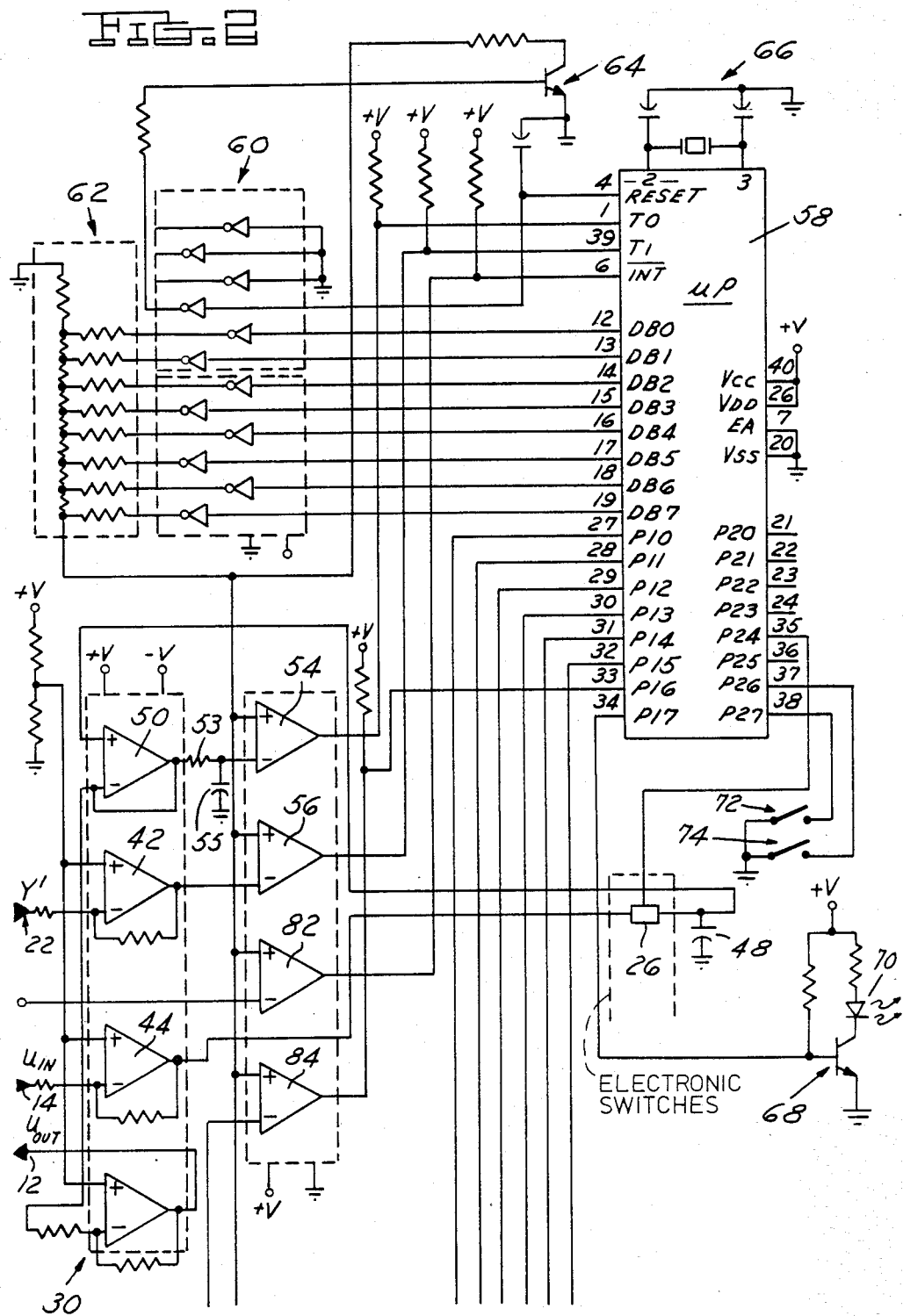

FIGS. 2 and 3 together illustrate that portion of the observer and actuator control electronics package in FIG. 1 enclosed by the phantom line. A pair of operational amplifiers 42, 44 respectively receive the Y' position signal from sensor 22 (FIG. 1) and the U error signal from amplifier 14, and function to shift the voltage levels of the respective position and error signals from the $-V$ to $+V$ input level range to the zero to $+V$ level range of the observer internal logic. The level-shifted error signal output from amplifier 44 is fed through controlled electronic switch 26 (FIGS. 1 and 2), which may comprise an FET switch, and is stored on a capacitor 48. The levelshifted error signal so stored on capacitor 48 is fed to a unity gain amplifier 50 and to a level reshift and zero order hold amplifier 30 (FIGS. 1 and 2), and thence as an output to actuator 12 (FIG. 1). A pair of comparators 54, 56 receive the respective position and error signal outputs of amplifiers 50, 42, and provide respective corresponding outputs to data inputs T0, T1 of a microprocessor 58. Note that the output of amplifier 50 is fed to comparator 54 by a delay network comprising a series resistor 53 and a shunt capacitor 55. In the presently preferred embodiment of the invention herein described, microprocessor 58 comprises an Intel 8748 microprocessor. Object code for programming microprocessor 58 is provided as an appendix to the disclosure, and details concerning operation thereof are provided hereinafter.

The data outputs DB0 through DB7 of microprocessor 58 are connected through corresponding inverters in a packaged inverter array 60, and thence through resistor ladder network 62 to the reference inputs of comparators 54, 56. As will be described in detail hereinafter, inverter array 60 and resistor ladder network 62 cooperate with comparators 54, 56 to perform an analog-to-digital conversion of the input position and error signals, and also cooperate with circuitry yet to be described for performing a digital-to-analog conversion of the observer estimated acceleration, velocity and position output signals. The $\overline{\text{RESET}}$ output of microprocessor 58 is connected to ladder network 62 through an inverter in array 60 and through a transistor 64 for setting the output estimated signals at a zero level upon initiation of operation, as will be described. A crystal circuit 66 is connected to microprocessor 58 for providing internal clock timing. The P17 output port of microprocessor 58 is connected through a transistor 68 to an LED 70 for alternately energizing and extinguishing LED 70 so as to indicate continuing operation of the observer electronics to an operator. A pair of toggle switches 72, 74 are connected selectively to ground corresponding microprocessor input ports P27, P26 for initiating a self-test operation in a manner to be described.

Turning to FIG. 3, a plurality of adjustable resistors 80 are connected to corresponding inputs of a multiplexer 82. Multiplexer 82 receives polling inputs A, B, C from output ports P10-P12 of microprocessor 58 (FIG. 2). Resistors 80 are for setting the input constants to the mathematical system model in microprocessor 58 in the manner to be described. The data output Xm of multiplexer 82 is connected to one input of a comparator 84 (FIG. 2), which receives a reference input from ladder network 62 and provides an output to the P16 input of microprocessor 58. Thus, inverter array 60 and ladder network 62 are adapted to cooperate with comparator 84 to perform an analog-to-digital conversion of the constant-indicative dc signals received from multiplexer 82. Ladder network 62 is also connected through a buffer amplifier 84 (FIG. 3) and thence through corresponding controlled electronic switches 86, 88, 90 to storage capacitors 92, 94, 96 at the inputs of the respective output amplifiers 98, 100, 102. Amplifiers 98, 100, 102 provide respective estimated acceleration, velocity and position signals A, V and Y. Switches 86, 88 and 90 are controlled by microprocessor output ports P15, P14 and P13 (FIG. 2).

As previously indicated in connection with FIG. 1, the presently preferred embodiment 10 of the invention contemplates an actuator position input to amplifier 14 as a function of measured position signal Y' indicated by position sensor 22. FIG. 4 illustrates a modified embodiment of the invention wherein estimated position Y at the output of amplifier 102 (FIG. 3) is fed to gain block 35 in place of the measured position signal Y'.

The mathematical model implemented by the observer feedback system for estimating state motion variables—i.e., position, velocity and acceleration—in accordance with the preferred embodiments of the invention herein-above described is given by the following vector equation:

$$x_{k+1} = \phi x_k + \Gamma U_k + D_k(Y'_k - Y_k) \tag{1}$$

where $x_{k+1}$ is a column vector comprised of N state variables, in this example, position, velocity and acceleration at time $(k+1)$, $x_k$ is the same column vector at time $k$—i.e. the preceding sampling interval, $D_k$ is a column vector of observer gains which may be set as desired depending upon desired location of the observer vector poles, $Y'_k$ is measured position at time k, and $Y_k$ is estimated position at time k.

$$\phi = e^{AT} \quad (2)$$

where T is the sampling period and A is a three-by-three (N by N in the general case) constant matrix representing physical parameters of the controlled system. Constants in the matrix A are set by resistors 80.

$$\Gamma = \int_0^T \phi B \, dt \quad (3)$$

where B is a one-by-three (1 by N) constant matrix.

$$\dot{x}_k = Ax_k + BU_k \quad (4)$$

where $\dot{x}_k$ is the time derivative of x at time k and $U_k$ is the error signal at time k. As will be apparent to persons having ordinary skill in the art, the various above constants can be readily obtained following known techniques. See, for example, Kuo, *Digital Control Systems*, SRL Publishing Company (1977), page 456 et seq; Lindorff, *Theory of Sampled-Data Control Systems*, John Wiley & Sons (1965), page 191 et seq; and Franklin et al, *Digital Control of Dynamic Systems*, Addison-Wesley (1980), page 131 et seq. See also the above-noted Baker paper.

Operation of the digital observer electronics of FIGS. 1-3 will be best understood with reference to the flow diagram of FIG. 5 and the attached appendix. Upon start-up, the system is first initialized by operation of the subroutine at lines 89-150 of the appendix. During the initialization operation, constants in the column vector $D_k$ set by resistors 80 are sequentially subjected to analog-to-digital conversion and read into microprocessor 58. This analog-to-digital conversion is accomplished for each constant in sequence by varying the analog reference voltage at comparator 84 through inverters 60 and ladder network 62, and observing the digital state of the comparator output to set successive significant bits of the converted digital signal. The analog-to-digital conversion subroutine appears at lines 585 to 669 of the appendix. Estimated acceleration, velocity and position at the outputs of amplifiers 98, 100 and 102 are initially set at a zero level during the initialization process. This is accomplished by the $\overline{\text{RESET}}$ output of microprocessor 58 operating in combination with ladder network 62 and buffer amplifier 85. A 2.5 volt analog signal (assuming 0 to 5 volt internal logic) is presented at each switch 86-90 and sequentially stored on capacitors 92-96 under control of microprocessor 58.

Following initialization, a computation set-up routine is entered per lines 153 to 265 of the appendix. During each pass through the computation set-up routine, one of the constants represented by resistor 80 is reentered by polling the appropriate adjustable resistor 80a through 80f as previously described. This continuous polling and re-calculation permits "on-the-fly" fine turning of the servo system during operation. The actual position signal Y' and the error signal U are subjected to analog-to-digital conversion in the manner previously described and stored within microprocessor 58. The T-timer, which controls sampling at a preferred period of 0.75 milliseconds, is reset and an N-sampling counter is updated. The N-sampling counter functions alternately to energize or extinguish LED 70 as previously described upon occurrence of a specific number of sampling intervals to indicate continuing operation of the observer.

At the next stage of operation, acceleration A is estimated. Velocity and position are likewise successively estimated. The acceleration, velocity and position estimation routines are at lines 269-426 and 428-526 of the appendix respectively. The computation end routine at lines 528-552 of the appendix outputs estimated acceleration, velocity and position to the sample-and-hold capacitors 92, 94, 96 (FIG. 3). Upon completion of the T-sampling time inverval, operation recycles to the computatin and set-up routine, and proceeds as previously described.

Among the subroutines at line 555 et seq of the appendix, the self-test routine at lines 1208-1327 is of particular interest. An operator, by alternately or simultaneously closing switches 72, 74 (FIG. 2), may test operation of various observer circuit portions using only a voltmeter or the like. More specifically, closure of switch 72 functions to provide a continuous periodic sawtooth waveform through inverters 60, ladder network 62 and buffer 85, and through switches 86-90, capacitors 92-96 and amplifiers 98-102, to the estimated acceleration, velocity and position outputs. Operation of these circuit elements, as well as operation of the overall digital-to-analog converter scheme, may thus be tested by observation of the estimated acceleration, velocity and position outputs. Closure of switch 74 functions to control the acceleration output to be exactly equal to the Y' input position signal, and the position output to be exactly equal to the U input error signal. Assuming that digital-to-analog operation has been successfully tested as previously described, this second test then functions to check operation of the analog-to-digital converter scheme effectuated by inverters 60, ladder network 62 and comparators 54, 56 as previously described. Finally, with both switches 72, 74 closed, the voltage level of the non-zero adjustable resistor 80a-80f, with all other resistors set at zero, is presented at all of the position, velocity and acceleration outputs.

In addition to the several advantages of the preferred embodiments of the invention hereinabove set forth, a number of important features should be noted. For example, whereas an actual physical servo system is normally described by non-linear differential equations, these equations have been linearized about the desired operating point in implementation of the invention. See Merritt, *Hydraulic Control Systems*, John Wiley & Sons (1967). The various constants which describe the linearized system may then be readily calculated per the above-cited references. These cited materials are incorporated herein by reference for the purpose of indicating background and state of the art.

Operational delays in conventional servo valves ordinarily would require four or five equations in order to estimate state motion variables, depending upon the transfer function of the valve. In accordance with an important feature of the present invention, the sampled error signal U is intentionally delayed within the observer electronics by the combination of resistor 53 and capacitor 55 to simulate the delay of the servo valve. This permits position, velocity and acceleration to be estimated on the basis of only three mathematical model equations.

Servo valves are flow limited and become saturated at some given input signal level. The observer model becomes saturated at a point corresponding to the same signal level to simulate the physical system.

It is contemplated that the preferred embodiment of the invention hereinabove described in detail may be susceptible to a variety of modifications and variations. One such modifications has been described in connection with FIG. 4, where estimated position rather than measured position is used for control of actuator motion through comparator 14. It will also be appreciated that the digital implementation of the observer electronics hereinabove described in connection with FIGS. 2 and 3 could be replaced by suitable analog circuitry adapted to implement the mathematical model per equations (1)–(4). Although the invention has been described in detail in connection with the preferred implementation in an electro-hydraulic servo control system, other power servo systems, such as electric and electro-pneumatic systems, are also contemplated.

If desired, the observer electronics may be designed to estimate state variables other than motion variables, such as load pressure, torque motor current, etc. In addition, third and fourth order time derivatives of position, etc. may be estimated where desired. In these connections, it will be appreciated that the observer electronics may be designed in the broadest sense to estimate N state variables on the basis of N model equations.

APPENDIX

| LOC | OBJ | LINE |
|---|---|---|
| | | 35 |
| | | 36 |
| | | 37 |
| | | 38 |
| | | 39 |
| | | 40 |
| | | 41 |
| | | 42 |
| | | 43 |
| | | 44 |
| | | 45 |
| | | 46 |
| | | 47 |
| | | 48 |
| | | 49 |
| | | 50 |
| | | 51 |
| | | 52 |
| | | 53 |
| | | 54 |
| | | 55 |
| | | 56 |
| | | 57 |
| | | 58 |
| | | 59 |
| | | 60 |
| | | 61 |
| | | 62 |
| | | 63 |
| | | 64 |
| | | 65 |
| | | 66 |
| | | 67 |
| | | 68 |
| | | 69 |
| | | 70 |
| | | 71 |
| | | 72 |
| | | 73 |
| | | 74 |
| | | 75 |
| | | 76 |
| | | 77 |
| | | 78 |
| | | 79 |
| | | 80 |
| | | 81 |
| | | 82 |
| | | 83 |
| | | 84 |
| | | 85 |
| | | 86 |
| | | 87 |
| | | 88 |
| | | 89 |
| | | 90 |
| | | 91 |
| | | 92 |
| | | 93 |
| | | 94 |
| | | 95 |
| | | 96 |
| 0000 | | 97 |
| 0000 | 0410 | 98 |
| | | 99 |
| 0010 | | 100 |
| 0010 | 2380 | 101 |
| 0012 | 02 | 102 |
| | | 103 |
| | | 104 |
| 0013 | B87F | 105 |
| 0015 | 8938 | 106 |
| 0017 | 00 | 107 |
| 0018 | 00 | 108 |
| 0019 | B000 | 109 |
| 001B | E815 | 110 |
| | | 111 |
| 001D | BB08 | 112 |
| 001F | FB | 113 |
| 0020 | 07 | 114 |
| 0021 | 39 | 115 |
| 0022 | 8940 | 116 |
| 0024 | 2304 | 117 |
| 0026 | 543B | 118 |
| 0028 | FB | 119 |
| 0029 | 031F | 120 |
| 002B | A8 | 121 |
| 002C | FE | 122 |
| 002D | A0 | 123 |
| 002E | EB1F | 124 |
| | | 125 |
| 0030 | 2302 | 126 |
| 0032 | 543B | 127 |
| 0034 | B828 | 128 |
| 0036 | FE | 129 |
| 0037 | A0 | 130 |
| | | 131 |
| 0038 | F23D | 132 |
| 003A | 37 | 133 |
| 003B | 043F | 134 |
| 003D | 0380 | 135 |
| 003F | B834 | 136 |
| 0041 | A0 | 137 |
| 0042 | 9490 | 138 |
| 0044 | 94A6 | 139 |
| 0046 | 94C4 | 140 |
| 0048 | 94E0 | 141 |
| 004A | B400 | 142 |
| 004C | B415 | 143 |
| 004E | B437 | 144 |
| 0050 | B44F | 145 |
| 0052 | B46A | 146 |
| 0054 | B486 | 147 |
| 0056 | B49F | 148 |

| | | | | |
|---|---|---|---|---|
| 0058 B840 | 149 | | 009E F0 | 211 |
| 005A B0F5 | 150 | | 009F 9433 | 212 |
| | 151 | | 00A1 B838 | 213 |
| | 152 | | 00A3 A0 | 214 |
| | 153 | | | 215 |
| | 154 | | | 216 |
| | 155 | | | 217 |
| | 156 | | | 218 |
| | 157 | | | 219 |
| | 158 | | | 220 |
| | 159 | | 00A4 B940 | 221 |
| | 160 | | 00A6 11 | 222 |
| | 161 | | 00A7 F1 | 223 |
| | 162 | | 00A8 96B0 | 224 |
| | 163 | | 00AA B1F5 | 225 |
| 005C 2300 | 164 | | 00AC B486 | 226 |
| 005E 62 | 165 | | 00AE 04F1 | 227 |
| 005F 55 | 166 | | 00B0 17 | 228 |
| 0060 BA10 | 167 | | 00B1 96B7 | 229 |
| | 168 | | 00B3 B46A | 230 |
| 0062 B82B | 169 | | 00B5 04F1 | 231 |
| 0064 F0 | 170 | | 00B7 17 | 232 |
| 0065 17 | 171 | | 00B8 96BE | 233 |
| 0066 A0 | 172 | | 00BA B44F | 234 |
| 0067 4340 | 173 | | 00BC 04F1 | 235 |
| 0069 53C7 | 174 | | 00BE 17 | 236 |
| 006B 39 | 175 | | 00BF 96C5 | 237 |
| | 176 | | 00C1 B437 | 238 |
| 006C 2304 | 177 | | 00C3 04F1 | 239 |
| 006E 543B | 178 | | 00C5 17 | 240 |
| 0070 AE | 179 | | 00C6 96CC | 241 |
| 0071 B82B | 180 | | 00C8 B415 | 242 |
| 0073 F0 | 181 | | 00CA 04F1 | 243 |
| 0074 5307 | 182 | | 00CC 17 | 244 |
| 0076 0320 | 183 | | 00CD 96D3 | 245 |
| 0078 A8 | 184 | | 00CF B400 | 246 |
| 0079 FE | 185 | | 00D1 04F1 | 247 |
| 007A A0 | 186 | | 00D3 17 | 248 |
| 007B 2300 | 187 | | 00D4 96DA | 249 |
| 007D 543B | 188 | | 00D6 94E0 | 250 |
| 007F B82A | 189 | | 00D8 04F1 | 251 |
| 0081 A0 | 190 | | 00DA 17 | 252 |
| | 191 | | 00DB 96E1 | 253 |
| 0082 2302 | 192 | | 00DD 94C4 | 254 |
| 0084 543B | 193 | | 00DF 04F1 | 255 |
| 0086 B828 | 194 | | 00E1 17 | 256 |
| 0088 A0 | 195 | | 00E2 96E8 | 257 |
| 0089 9AEF | 196 | | 00E4 94A6 | 258 |
| | 197 | | 00E6 04F1 | 259 |
| 008B 2301 | 198 | | 00E8 17 | 260 |
| 008D 543B | 199 | | 00E9 96EF | 261 |
| 008F B829 | 200 | | 00EB 9490 | 262 |
| 0091 A0 | 201 | | 00ED 04F1 | 263 |
| | 202 | | 00EF B49F | 264 |
| 0092 B835 | 203 | | 00F1 00 | 265 |
| 0094 F0 | 204 | | | 266 |
| 0095 02 | 205 | | | 267 |
| 0096 8908 | 206 | | | 268 |
| 0098 B83B | 207 | | | 269 |
| 009A F0 | 208 | | | 270 |
| 009B AA | 209 | | | 271 |
| 009C B828 | 210 | | | 272 |

| | |
|---|---|
| 00F2 | B847 |
| 00F4 | F0 |
| 00F5 | A9 |
| 00F6 | B83A |
| 00F8 | F0 |
| 00F9 | AA |
| 00FA | 5422 |
| 00FC | AE |
| 00FD | F9 |
| 00FE | AF |
| | |
| 00FF | B849 |
| 0101 | F0 |
| 0102 | A9 |
| 0103 | B829 |
| 0105 | F0 |
| 0106 | AA |
| 0107 | 5422 |
| 0109 | 5495 |
| | |
| 010B | B848 |
| 010D | F0 |
| 010E | AA |
| 010F | B839 |
| 0111 | F0 |
| 0112 | A9 |
| 0113 | 5422 |
| 0115 | 5495 |
| 0117 | 9467 |
| | |
| 0119 | B827 |
| 011B | F0 |
| 011C | A9 |
| 011D | B838 |
| 011F | F0 |
| 0120 | AA |
| 0121 | 5422 |
| 0123 | A5 |
| 0124 | BB01 |
| 0126 | BD03 |
| 0128 | 9400 |
| 012A | 5495 |
| | |
| 012C | FF |
| 012D | B92F |
| 012F | A1 |
| 0130 | FE |
| 0131 | C9 |
| 0132 | A1 |
| 0133 | 9474 |
| 0135 | B82C |
| 0137 | A0 |
| 0138 | F23E |
| 013A | 0380 |
| 013C | 2440 |
| 013E | 37 |
| 013F | 17 |
| 0140 | B92D |
| 0142 | A1 |
| | |
| 0143 | B839 |
| 0145 | F0 |
| 0146 | A9 |
| 0147 | B845 |
| 0149 | F0 |
| 014A | AA |
| 014B | 5422 |
| 014D | AE |
| 014E | F9 |
| 014F | AF |
| | |
| 0150 | B846 |
| 0152 | F0 |
| 0153 | AA |
| 0154 | B829 |
| 0156 | F0 |
| 0157 | A9 |
| 0158 | 5422 |
| 015A | 5495 |
| | |
| 015C | BB44 |
| 015E | F0 |
| 015F | AA |
| 0160 | B83A |
| 0162 | F0 |
| 0163 | A9 |
| 0164 | 5422 |
| 0166 | 5495 |
| 0168 | 9467 |
| | |
| 016A | B824 |
| 016C | F0 |
| 016D | A9 |
| 016E | B838 |
| 0170 | F0 |
| 0171 | AA |
| 0172 | 5422 |
| 0174 | A5 |
| 0175 | BB01 |

| | |
|---|---|
| 0177 BD03 | 398 |
| 0179 9400 | 399 |
| 017B 5495 | 400 |
| | 401 |
| 017D FF | 402 |
| 017E B933 | 403 |
| 0180 A1 | 404 |
| 0181 FE | 405 |
| 0182 C9 | 406 |
| 0183 A1 | 407 |
| 0184 9474 | 408 |
| 0186 B830 | 409 |
| 0188 A0 | 410 |
| | 411 |
| | 412 |
| 0189 F28F | 413 |
| 018B 0380 | 414 |
| 018D 2491 | 415 |
| 018F 37 | 416 |
| 0190 17 | 417 |
| 0191 B931 | 418 |
| 0193 A1 | 419 |
| | 420 |
| | 421 |
| 0194 B831 | 422 |
| 0196 F0 | 423 |
| 0197 99C7 | 424 |
| 0199 02 | 425 |
| 019A 8910 | 426 |
| | 427 |
| | 428 |
| | 429 |
| | 430 |
| | 431 |
| | 432 |
| | 433 |
| | 434 |
| | 435 |
| | 436 |
| | 437 |
| | 438 |
| | 439 |
| 019C B841 | 440 |
| 019E F0 | 441 |
| 019F A9 | 442 |
| 01A0 B83A | 443 |
| 01A2 F0 | 444 |
| 01A3 AA | 445 |
| 01A4 5422 | 446 |
| 01A6 AE | 447 |
| 01A7 F9 | 448 |
| 01A8 AF | 449 |
| 01A9 B843 | 450 |
| 01AB F0 | 451 |
| 01AC A9 | 452 |
| 01AD B829 | 453 |
| 01AF F0 | 454 |
| 01B0 AA | 455 |
| 01B1 5422 | 456 |
| 01B3 5495 | 457 |
| 01B5 B82D | 458 |
| 01B7 F0 | 459 |
| 01B8 99C7 | 460 |
| 01BA 02 | 461 |
| 01BB 8920 | 462 |
| | 463 |
| 01BD B842 | 464 |
| 01BF F0 | 465 |
| 01C0 AA | 466 |
| 01C1 B839 | 467 |
| 01C3 F0 | 468 |
| 01C4 A9 | 469 |
| 01C5 5422 | 470 |
| 01C7 5495 | 471 |
| 01C9 9467 | 472 |
| | 473 |
| 01CB B837 | 474 |
| 01CD F0 | 475 |
| 01CE A9 | 476 |
| 01CF C8 | 477 |
| 01D0 F0 | 478 |
| 01D1 5495 | 479 |
| | 480 |
| 01D3 B822 | 481 |
| 01D5 F0 | 482 |
| 01D6 A9 | 483 |
| 01D7 B838 | 484 |
| 01D9 F0 | 485 |
| 01DA AA | 486 |
| 01DB 5422 | 487 |
| 01DD A5 | 488 |
| 01DE BB01 | 489 |
| 01E0 BD03 | 490 |
| 01E2 9400 | 491 |
| 01E4 5495 | 492 |
| | 493 |
| 01E6 FF | 494 |
| 01E7 F7 | 495 |
| 01E8 28 | 496 |
| 01E9 FE | 497 |
| 01EA F7 | 498 |
| 01EB 28 | 499 |
| | 500 |
| 01EC FF | 501 |
| 01ED B937 | 502 |
| 01EF A1 | 503 |
| 01F0 C9 | 504 |
| 01F1 FE | 505 |
| 01F2 A1 | 506 |
| | 507 |
| 01F3 F7 | 508 |
| 01F4 F8 | 509 |
| 01F5 E6F9 | 510 |
| 01F7 4380 | 511 |
| 01F9 B934 | 512 |
| 01FB A1 | 513 |
| 01FC AA | 514 |
| 01FD 00 | 515 |
| 01FE 00 | 516 |
| 01FF F205 | 517 |
| 0201 0380 | 518 |
| 0203 4408 | 519 |
| 0205 FA | 520 |
| 0206 37 | 521 |

| | |
|---|---|
| 0207 17 | |
| 0208 B935 | |
| 020A A1 | |
| | |
| 020B B839 | |
| 020D B92C | |
| 020F F1 | |
| 0210 A0 | |
| 0211 18 | |
| 0212 B930 | |
| 0214 F1 | |
| 0215 A0 | |
| 0216 18 | |
| 0217 B934 | |
| 0219 F1 | |
| 021A A0 | |
| | |
| 021B 42 | |
| 021C 039C | |
| 021E E61B | |
| 0220 045C | |
| | |
| 0222 BC00 | |
| 0224 F9 | |
| 0225 DA | |
| 0226 5380 | |
| 0228 C62C | |
| 022A BC01 | |
| 022C F9 | |
| 022D 537F | |
| 022F A9 | |
| 0230 FA | |
| 0231 537F | |
| 0233 AA | |
| 0234 74C0 | |
| 0236 EC3A | |
| 0238 4380 | |
| | |
| 023A 83 | |
| 023B BF08 | |
| 023D BD00 | |
| 023F BE00 | |
| 0241 97 | |
| 0242 A7 | |
| | |
| 0243 1283 | |
| 0245 3271 | |
| 0247 525B | |
| | |
| 0249 FD | |
| 024A 67 | |
| 024B AD | |
| 024C 4E | |
| 024D 02 | |
| 024E 00 | |
| 024F 00 | |
| 0250 00 | |
| 0251 00 | |
| 0252 8655 | |
| 0254 AE | |
| 0255 EF49 | |
| 0257 FE | |
| 0258 54EB | |
| 025A 83 | |
| | |
| 025B FD | |
| 025C 67 | |
| 025D AD | |
| 025E 4E | |
| 025F 02 | |
| 0260 2C | |
| 0261 09 | |
| 0262 37 | |
| 0263 00 | |
| 0264 00 | |
| 0265 00 | |
| 0266 00 | |
| 0267 D26B | |
| 0269 2C | |
| 026A AE | |
| 026B EF5B | |
| 026D FE | |
| 026E 54EB | |
| 0270 83 | |
| | |
| 0271 FD | |
| 0272 67 | |
| 0273 AD | |
| 0274 4E | |
| 0275 02 | |
| 0276 00 | |
| 0277 00 | |

| | | |
|---|---|---|
| 0278 | 00 | 646 |
| 0279 | 00 | 647 |
| 027A | 467D | 648 |
| 027C | AE | 649 |
| 027D | EF71 | 650 |
| 027F | FE | 651 |
| 0280 | 54EB | 652 |
| 0282 | 83 | 653 |
| | | 654 |
| 0283 | FD | 655 |
| 0284 | 67 | 656 |
| 0285 | AD | 657 |
| 0286 | 4E | 658 |
| 0287 | 02 | 659 |
| 0288 | 00 | 660 |
| 0289 | 00 | 661 |
| 028A | 00 | 662 |
| 028B | 00 | 663 |
| 028C | 266F | 664 |
| 028E | AE | 665 |
| 028F | EF83 | 666 |
| 0291 | FE | 667 |
| 0292 | 54EB | 668 |
| 0294 | 83 | 669 |
| | | 670 |
| | | 671 |
| | | 672 |
| | | 673 |
| | | 674 |
| | | 675 |
| | | 676 |
| | | 677 |
| 0295 | A8 | 678 |
| 0296 | DE | 679 |
| 0297 | F2B0 | 680 |
| | | 681 |
| 0299 | F9 | 682 |
| 029A | 6F | 683 |
| 029B | AF | 684 |
| | | 685 |
| 029C | FE | 686 |
| 029D | 78 | 687 |
| 029E | AE | 688 |
| | | 689 |
| 029F | 37 | 690 |
| 02A0 | D2A6 | 691 |
| 02A2 | BFFF | 692 |
| 02A4 | BE3F | 693 |
| | | 694 |
| 02A6 | F8 | 695 |
| 02A7 | 37 | 696 |
| 02A8 | F2EA | 697 |
| 02AA | FE | 698 |
| 02AB | 4380 | 699 |
| 02AD | AE | 700 |
| 02AE | 44EA | 701 |
| | | 702 |
| 02B0 | F8 | 703 |
| 02B1 | F2C1 | 704 |
| 02B3 | FF | 705 |
| 02B4 | 37 | 706 |
| 02B5 | 0301 | 707 |
| 02B7 | AF | 708 |
| 02B8 | FE | 709 |
| 02B9 | 533F | 710 |
| 02BB | 37 | 711 |
| 02BC | 1300 | 712 |
| 02BE | AE | 713 |
| 02BF | 44CD | 714 |
| | | 715 |
| 02C1 | F9 | 716 |
| 02C2 | 37 | 717 |
| 02C3 | 0301 | 718 |
| 02C5 | A9 | 719 |
| 02C6 | F8 | 720 |
| 02C7 | 533F | 721 |
| 02C9 | 37 | 722 |
| 02CA | 1300 | 723 |
| 02CC | A8 | 724 |
| | | 725 |
| 02CD | F9 | 726 |
| 02CE | 6F | 727 |
| 02CF | AF | 728 |
| 02D0 | F8 | 729 |
| 02D1 | 7E | 730 |
| 02D2 | AE | 731 |
| | | 732 |
| 02D3 | 37 | 733 |
| 02D4 | D2E6 | 734 |
| 02D6 | FF | 735 |
| 02D7 | 37 | 736 |
| 02D8 | 0301 | 737 |
| 02DA | AF | 738 |
| 02DB | FE | 739 |
| 02DC | 37 | 740 |
| 02DD | 1300 | 741 |
| 02DF | 4380 | 742 |
| 02E1 | 53BF | 743 |
| 02E3 | AE | 744 |
| 02E4 | 44EA | 745 |
| 02E6 | FE | 746 |
| 02E7 | 533F | 747 |
| 02E9 | AE | 748 |
| | | 749 |
| 02EA | 83 | 750 |
| | | 751 |
| | | 752 |
| | | 753 |
| | | 754 |
| | | 755 |
| | | 756 |
| 02EB | F2F0 | 757 |
| 02ED | 0380 | 758 |
| 02EF | 37 | 759 |
| 02F0 | 83 | 760 |
| | | 761 |
| | | 762 |
| 0300 | | 763 |
| 0300 | 00 | 764 |
| 0301 | 01 | |
| 0302 | 02 | |
| 0303 | 03 | |
| 0304 | 04 | |
| 0305 | 05 | |

| | | | | |
|---|---|---|---|---|
| 0306 | 06 | | 0344 | 42 |
| 0307 | 07 | | 0345 | 43 |
| 0308 | 08 | 765 | 0346 | 44 |
| 0309 | 09 | | 0347 | 45 |
| 030A | 0A | | 0348 | 46 | 773
| 030B | 0B | | 0349 | 47 |
| 030C | 0C | | 034A | 47 |
| 030D | 0D | | 034B | 48 |
| 030E | 0E | | 034C | 49 |
| 030F | 0F | | 034D | 4A |
| 0310 | 10 | 766 | 034E | 4B |
| 0311 | 11 | | 034F | 4C |
| 0312 | 12 | | 0350 | 4C | 774
| 0313 | 13 | | 0351 | 4D |
| 0314 | 14 | | 0352 | 4E |
| 0315 | 15 | | 0353 | 4F |
| 0316 | 16 | | 0354 | 50 |
| 0317 | 17 | | 0355 | 50 |
| 0318 | 18 | 767 | 0356 | 51 |
| 0319 | 19 | | 0357 | 52 |
| 031A | 1A | | 0358 | 53 | 775
| 031B | 1B | | 0359 | 54 |
| 031C | 1C | | 035A | 54 |
| 031D | 1D | | 035B | 55 |
| 031E | 1E | | 035C | 56 |
| 031F | 1F | | 035D | 57 |
| 0320 | 20 | 768 | 035E | 57 |
| 0321 | 21 | | 035F | 58 |
| 0322 | 22 | | 0360 | 59 | 776
| 0323 | 23 | | 0361 | 5A |
| 0324 | 24 | | 0362 | 5A |
| 0325 | 25 | | 0363 | 5B |
| 0326 | 26 | | 0364 | 5C |
| 0327 | 27 | | 0365 | 5D |
| 0328 | 28 | 769 | 0366 | 5D |
| 0329 | 29 | | 0367 | 5E |
| 032A | 2A | | 0368 | 5F | 777
| 032B | 2B | | 0369 | 5F |
| 032C | 2C | | 036A | 60 |
| 032D | 2D | | 036B | 61 |
| 032E | 2E | | 036C | 61 |
| 032F | 2F | | 036D | 62 |
| 0330 | 30 | 770 | 036E | 63 |
| 0331 | 31 | | 036F | 63 |
| 0332 | 32 | | 0370 | 64 | 778
| 0333 | 33 | | 0371 | 65 |
| 0334 | 34 | | 0372 | 65 |
| 0335 | 35 | | 0373 | 66 |
| 0336 | 36 | | 0374 | 66 |
| 0337 | 37 | | 0375 | 67 |
| 0338 | 37 | 771 | 0376 | 68 |
| 0339 | 38 | | 0377 | 68 |
| 033A | 39 | | 0378 | 69 | 779
| 033B | 3A | | 0379 | 69 |
| 033C | 3B | | 037A | 6A |
| 033D | 3C | | 037B | 6B |
| 033E | 3D | | 037C | 6B |
| 033F | 3E | | 037D | 6C |
| 0340 | 3F | 772 | 037E | 6C |
| 0341 | 40 | | 037F | 6D |
| 0342 | 40 | | 0380 | 6D | 780
| 0343 | 41 | | | |

| | | | | |
|---|---|---|---|---|
| 0381 | 6E | | 03BF | 80 |
| 0382 | 6E | | | |
| 0383 | 6F | | | |
| 0384 | 6F | | | |
| 0385 | 70 | | | |
| 0386 | 70 | | | |
| 0387 | 71 | | | |
| 0388 | 71 | 781 | | |
| 0389 | 72 | | 03C0 | BB08 |
| 038A | 72 | | 03C2 | 27 |
| 038B | 73 | | 03C3 | 97 |
| 038C | 73 | | 03C4 | 67 |
| 038D | 74 | | 03C5 | 29 |
| 038E | 74 | | 03C6 | 67 |
| 038F | 75 | | 03C7 | 29 |
| 0390 | 75 | 782 | 03C8 | E6CB |
| 0391 | 75 | | 03CA | 6A |
| 0392 | 76 | | 03CB | EBC4 |
| 0393 | 76 | | 03CD | 67 |
| 0394 | 77 | | 03CE | 29 |
| 0395 | 77 | | 03CF | 67 |
| 0396 | 77 | | 03D0 | 29 |
| 0397 | 78 | | 03D1 | 83 |
| 0398 | 78 | 783 | | |
| 0399 | 78 | | | |
| 039A | 79 | | | |
| 039B | 79 | | | |
| 039C | 79 | | | |
| 039D | 7A | | | |
| 039E | 7A | | | |
| 039F | 7A | | | |
| 03A0 | 7B | 784 | | |
| 03A1 | 7B | | | |
| 03A2 | 7B | | | |
| 03A3 | 7B | | | |
| 03A4 | 7C | | | |
| 03A5 | 7C | | 0400 | |
| 03A6 | 7C | | 0400 | 97 |
| 03A7 | 7C | | 0401 | 85 |
| 03A8 | 7D | 785 | 0402 | 95 |
| 03A9 | 7D | | 0403 | F206 |
| 03AA | 7D | | 0405 | 95 |
| 03AB | 7D | | 0406 | 537F |
| 03AC | 7E | | 0408 | 7617 |
| 03AD | 7E | | 040A | 29 |
| 03AE | 7E | | 040B | F7 |
| 03AF | 7E | | 040C | 29 |
| 03B0 | 7E | 786 | 040D | F7 |
| 03B1 | 7E | | 040E | 97 |
| 03B2 | 7F | | 040F | F22D |
| 03B3 | 7F | | 0411 | D225 |
| 03B4 | 7F | | 0413 | ED0A |
| 03B5 | 7F | | 0415 | 841E |
| 03B6 | 7F | | 0417 | 67 |
| 03B7 | 7F | | 0418 | 29 |
| 03B8 | 7F | 787 | 0419 | 67 |
| 03B9 | 7F | | 041A | 29 |
| 03BA | 80 | | 041B | 97 |
| 03BB | 80 | | 041C | ED17 |
| 03BC | 80 | | 041E | 4380 |
| 03BD | 80 | | 0420 | B624 |
| 03BE | 80 | | 0422 | 537F |

| | | |
|---|---|---|
| 0424 83 | 849 | |
| 0425 EB13 | 850 | |
| 0427 B9FF | 851 | |
| 0429 233F | 852 | |
| 042B 841E | 853 | |
| 042D B9FF | 854 | |
| 042F 237F | 855 | |
| 0431 841E | 856 | |
| | 857 | |
| | 858 | |
| | 859 | |
| | 860 | |
| | 861 | |
| | 862 | |
| | 863 | |
| 0433 AB | 864 | |
| 0434 DA | 865 | |
| 0435 F257 | 866 | |
| | 867 | |
| 0437 FA | 868 | |
| 0438 537F | 869 | |
| 043A C63E | 870 | |
| 043C 8441 | 871 | |
| 043E FB | 872 | |
| 043F 8456 | 873 | |
| 0441 37 | 874 | |
| 0442 17 | 875 | |
| 0443 AA | 876 | |
| 0444 FB | 877 | |
| 0445 537F | 878 | |
| 0447 6A | 879 | |
| 0448 F64E | 880 | |
| 044A 37 | 881 | |
| 044B 17 | 882 | |
| 044C 4380 | 883 | |
| 044E 2B | 884 | |
| 044F F7 | 885 | |
| 0450 27 | 886 | |
| 0451 E655 | 887 | |
| 0453 2380 | 888 | |
| 0455 6B | 889 | |
| 0456 83 | 890 | |
| | 891 | |
| 0457 FA | 892 | |
| 0458 537F | 893 | |
| 045A AA | 894 | |
| 045B FB | 895 | |
| 045C 537F | 896 | |
| 045E 6A | 897 | |
| 045F F263 | 898 | |
| 0461 8465 | 899 | |
| 0463 237F | 900 | |
| 0465 844E | 901 | |
| | 902 | |
| | 903 | |
| | 904 | |
| | 905 | |
| | 906 | |
| 0467 FF | 907 | |
| 0468 A9 | 908 | |
| 0469 FE | 909 | |
| 046A A5 | 910 | |
| 046B B5 | 911 | |
| 046C BD04 | 912 | |
| 046E 9400 | 913 | |
| 0470 AE | 914 | |
| 0471 F9 | 915 | |
| 0472 AF | 916 | |
| 0473 83 | 917 | |
| | 918 | |
| | 919 | |
| | 920 | |
| | 921 | |
| | 922 | |
| 0474 FF | 923 | |
| 0475 A9 | 924 | |
| 0476 FE | 925 | |
| 0477 A5 | 926 | |
| 0478 BB00 | 927 | |
| 047A BD05 | 928 | |
| 047C 9400 | 929 | |
| 047E 83 | 930 | |
| | 931 | |
| | 932 | |
| | 933 | |
| | 934 | |
| | 935 | |
| | 936 | |
| 0490 | 937 | |
| 0490 B820 | 938 | |
| 0492 F0 | 939 | |
| 0493 E3 | 940 | |
| 0494 B93C | 941 | |
| 0496 A1 | 942 | |
| 0497 F0 | 943 | |
| 0498 37 | 944 | |
| 0499 17 | 945 | |
| 049A 03C4 | 946 | |
| 049C E3 | 947 | |
| 049D 19 | 948 | |
| 049E A1 | 949 | |
| 049F B844 | 950 | |
| 04A1 A0 | 951 | |
| 04A2 B848 | 952 | |
| 04A4 A0 | 953 | |
| 04A5 83 | 954 | |
| | 955 | |
| | 956 | |
| | 957 | |
| | 958 | |
| | 959 | |
| | 960 | |
| 04A6 B821 | 961 | |
| 04A8 F0 | 962 | |
| 04A9 37 | 963 | |
| 04AA 17 | 964 | |
| 04AB 037D | 965 | |
| 04AD A9 | 966 | |
| 04AE B83C | 967 | |
| 04B0 F0 | 968 | |
| 04B1 AA | 969 | |
| 04B2 74C0 | 970 | |

| | | | | |
|---|---|---|---|---|
| 04B4 | AA | 971 | 0503 | 37 | 1033 |
| 04B5 | F9 | 972 | 0504 | 17 | 1034 |
| 04B6 | B920 | 973 | 0505 | 037D | 1035 |
| 04B8 | B4A9 | 974 | 0507 | A9 | 1036 |
| 04BA | B841 | 975 | 0508 | B83C | 1037 |
| 04BC | A0 | 976 | 050A | F0 | 1038 |
| 04BD | 0381 | 977 | 050B | AA | 1039 |
| 04BF | E6C3 | 978 | 050C | 74C0 | 1040 |
| 04C1 | B07F | 979 | 050E | B84C | 1041 |
| 04C3 | 83 | 980 | 0510 | A0 | 1042 |
| | | 981 | 0511 | F9 | 1043 |
| | | 982 | 0512 | 18 | 1044 |
| | | 983 | 0513 | A0 | 1045 |
| | | 984 | 0514 | 83 | 1046 |
| | | 985 | | | 1047 |
| 04C4 | B821 | 986 | | | 1048 |
| 04C6 | F0 | 987 | | | 1049 |
| 04C7 | 37 | 988 | 0515 | B84C | 1050 |
| 04C8 | 17 | 989 | 0517 | F0 | 1051 |
| 04C9 | 037D | 990 | 0518 | AA | 1052 |
| 04CB | A9 | 991 | 0519 | 18 | 1053 |
| 04CC | B83D | 992 | 051A | F0 | 1054 |
| 04CE | F0 | 993 | 051B | B920 | 1055 |
| 04CF | 37 | 994 | 051D | B4A9 | 1056 |
| 04D0 | 17 | 995 | 051F | 37 | 1057 |
| 04D1 | 0380 | 996 | 0520 | 17 | 1058 |
| 04D3 | AA | 997 | 0521 | 0380 | 1059 |
| 04D4 | 74C0 | 998 | 0523 | A9 | 1060 |
| 04D6 | AA | 999 | 0524 | B823 | 1061 |
| 04D7 | F9 | 1000 | 0526 | F0 | 1062 |
| 04D8 | B920 | 1001 | 0527 | AA | 1063 |
| 04DA | B4A9 | 1002 | 0528 | 74C0 | 1064 |
| 04DC | B84A | 1003 | 052A | B843 | 1065 |
| 04DE | A0 | 1004 | 052C | 9634 | 1066 |
| 04DF | 83 | 1005 | 052E | 29 | 1067 |
| | | 1006 | 052F | A0 | 1068 |
| | | 1007 | 0530 | 0381 | 1069 |
| | | 1008 | 0532 | E636 | 1070 |
| 04E0 | B84A | 1009 | 0534 | B07F | 1071 |
| 04E2 | F0 | 1010 | 0536 | 83 | 1072 |
| 04E3 | A9 | 1011 | | | 1073 |
| 04E4 | BA7D | 1012 | | | 1074 |
| 04E6 | 74C0 | 1013 | | | 1075 |
| 04E8 | AA | 1014 | | | 1076 |
| 04E9 | F9 | 1015 | 0537 | B83C | 1077 |
| 04EA | B920 | 1016 | 0539 | F0 | 1078 |
| 04EC | B4A9 | 1017 | 053A | AA | 1079 |
| 04EE | B842 | 1018 | 053B | B97D | 1080 |
| 04F0 | A0 | 1019 | 053D | 74C0 | 1081 |
| 04F1 | 0381 | 1020 | 053F | AA | 1082 |
| 04F3 | E6F7 | 1021 | 0540 | F9 | 1083 |
| 04F5 | B07F | 1022 | 0541 | B920 | 1084 |
| 04F7 | 83 | 1023 | 0543 | B4A9 | 1085 |
| | | 1024 | 0545 | B845 | 1086 |
| | | 1025 | 0547 | A0 | 1087 |
| 0500 | | 1026 | 0548 | 0381 | 1088 |
| | | 1027 | 054A | E64E | 1089 |
| | | 1028 | 054C | B07F | 1090 |
| | | 1029 | 054E | 83 | 1091 |
| | | 1030 | | | 1092 |
| 0500 | B821 | 1031 | | | 1093 |
| 0502 | F0 | 1032 | | | 1094 |

| | | |
|---|---|---|
| 054F | B83D | 1096 |
| 0551 | F0 | 1097 |
| 0552 | 37 | 1098 |
| 0553 | 17 | 1099 |
| 0554 | 0380 | 1100 |
| 0556 | AA | 1101 |
| 0557 | B823 | 1102 |
| 0559 | F0 | 1103 |
| 055A | A9 | 1104 |
| 055B | 74C0 | 1105 |
| 055D | B846 | 1106 |
| 055F | 9667 | 1107 |
| 0561 | 29 | 1108 |
| 0562 | A0 | 1109 |
| 0563 | 0381 | 1110 |
| 0565 | E669 | 1111 |
| 0567 | B07F | 1112 |
| 0569 | 83 | 1113 |
| 056A | B820 | 1119 |
| 056C | F0 | 1120 |
| 056D | A9 | 1121 |
| 056E | B83C | 1122 |
| 0570 | F0 | 1123 |
| 0571 | AA | 1124 |
| 0572 | 74C0 | 1125 |
| 0574 | AA | 1126 |
| 0575 | F9 | 1127 |
| 0576 | B94E | 1128 |
| 0578 | B17D | 1129 |
| 057A | B4A9 | 1130 |
| 057C | B847 | 1131 |
| 057E | 0380 | 1132 |
| 0580 | A0 | 1133 |
| 0581 | E685 | 1134 |
| 0583 | B0FF | 1135 |
| 0585 | 83 | 1136 |
| 0586 | B847 | 1141 |
| 0588 | F0 | 1142 |
| 0589 | 0380 | 1143 |
| 058B | AA | 1144 |
| 058C | B823 | 1145 |
| 058E | F0 | 1146 |
| 058F | A9 | 1147 |
| 0590 | 74C0 | 1148 |
| 0592 | B849 | 1149 |
| 0594 | 969C | 1150 |
| 0596 | 29 | 1151 |
| 0597 | A0 | 1152 |
| 0598 | 0381 | 1153 |
| 059A | E69E | 1154 |
| 059C | B07F | 1155 |
| 059E | 83 | 1156 |
| 059F | 0A | 1162 |
| 05A0 | 53C0 | 1163 |
| 05A2 | D3C0 | 1164 |
| 05A4 | C6A8 | 1165 |
| 05A6 | C400 | 1166 |
| 05A8 | 83 | 1167 |
| 05A9 | 2A | 1175 |
| 05AA | BF08 | 1176 |
| 05AC | 37 | 1177 |
| 05AD | 61 | 1178 |
| 05AE | 37 | 1179 |
| 05AF | F6B6 | 1180 |
| 05B1 | A7 | 1181 |
| 05B2 | 23FF | 1182 |
| 05B4 | A4CF | 1183 |
| 05B6 | 61 | 1184 |
| 05B7 | 97 | 1185 |
| 05B8 | 2A | 1186 |
| 05B9 | F7 | 1187 |
| 05BA | 2A | 1188 |
| 05BB | F7 | 1189 |
| 05BC | E6C3 | 1190 |
| 05BE | 37 | 1191 |
| 05BF | 61 | 1192 |
| 05C0 | 37 | 1193 |
| 05C1 | A4CB | 1194 |
| 05C3 | 37 | 1195 |
| 05C4 | 61 | 1196 |
| 05C5 | 37 | 1197 |
| 05C6 | E6CB | 1198 |
| 05C8 | 61 | 1199 |
| 05C9 | A4CC | 1200 |
| 05CB | 1A | 1201 |
| 05CC | EFB7 | 1202 |
| 05CE | 97 | 1203 |
| 05CF | 2A | 1204 |
| 05D0 | 83 | 1205 |
| 0600 | | 1217 |
| 0600 | B87F | 1218 |

| | | |
|---|---|---|
| 0602 | B000 | 1219 |
| 0604 | E802 | 1220 |
| 0606 | BEFF | 1221 |
| 0608 | BFFF | 1222 |
| 060A | 00 | 1223 |
| 060B | 00 | 1224 |
| 060C | 00 | 1225 |
| 060D | 00 | 1226 |
| 060E | EF0A | 1227 |
| 0610 | EE08 | 1228 |
| 0612 | 95 | 1229 |
| 0613 | 8980 | 1230 |
| 0615 | B619 | 1231 |
| 0617 | 997F | 1232 |
| 0619 | 0A | 1233 |
| 061A | 53C0 | 1234 |
| 061C | AD | 1235 |
| 061D | D3C0 | 1236 |
| 061F | 9623 | 1237 |
| 0621 | 0410 | 1238 |
| 0623 | FD | 1239 |
| 0624 | D380 | 1240 |
| 0626 | C63B | 1241 |
| 0628 | CC | 1242 |
| 0629 | FC | 1243 |
| 062A | 9606 | 1244 |
| 062C | 8938 | 1245 |
| 062E | 02 | 1246 |
| 062F | EB2F | 1247 |
| 0631 | 99C7 | 1248 |
| 0633 | BA03 | 1249 |
| 0635 | EA35 | 1250 |
| 0637 | EB33 | 1251 |
| 0639 | C428 | 1252 |
| 063B | 2300 | 1253 |
| 063D | 543B | 1254 |
| 063F | B833 | 1255 |
| 0641 | A0 | 1256 |
| 0642 | 2301 | 1257 |
| 0644 | 543B | 1258 |
| 0646 | B829 | 1259 |
| 0648 | A0 | 1260 |
| 0649 | 2302 | 1261 |
| 064B | 543B | 1262 |
| 064D | B828 | 1263 |
| 064F | A0 | 1264 |
| 0650 | BB08 | 1265 |
| 0652 | D5 | 1266 |
| 0653 | 1A | 1267 |
| 0654 | FA | 1268 |
| 0655 | 43C0 | 1269 |
| 0657 | 53C7 | 1270 |
| 0659 | B65D | 1271 |
| 065B | 537F | 1272 |
| 065D | 39 | 1273 |
| 065E | C5 | 1274 |
| 065F | 2304 | 1275 |
| 0661 | 543B | 1276 |
| 0663 | FB | 1277 |
| 0664 | 031F | 1278 |
| 0666 | A8 | 1279 |
| 0667 | FE | 1280 |
| 0668 | A0 | 1281 |
| 0669 | EB52 | 1282 |
| 066B | 0A | 1283 |
| 066C | 53C0 | 1284 |
| 066E | D340 | 1285 |
| 0670 | 96A1 | 1286 |
| 0672 | B828 | 1287 |
| 0674 | F0 | 1288 |
| 0675 | 02 | 1289 |
| 0676 | 8908 | 1290 |
| 0678 | B800 | 1291 |
| 067A | E87A | 1292 |
| 067C | 99F7 | 1293 |
| 067E | B829 | 1294 |
| 0680 | 02 | 1295 |
| 0681 | 8910 | 1296 |
| 0683 | B800 | 1297 |
| 0685 | E885 | 1298 |
| 0687 | 99EF | 1299 |
| 0689 | B833 | 1300 |
| 068B | 02 | 1301 |
| 068C | 8920 | 1302 |
| 068E | B800 | 1303 |
| 0690 | E890 | 1304 |
| 0692 | 99DF | 1305 |
| 0694 | D5 | 1306 |
| 0695 | E89E | 1307 |
| 0697 | 95 | 1308 |
| 0698 | 8980 | 1309 |
| 069A | B69E | 1310 |
| 069C | 997F | 1311 |
| 069E | C5 | 1312 |
| 069F | C419 | 1313 |
| 06A1 | B81F | 1314 |
| 06A3 | BB08 | 1315 |
| 06A5 | 18 | 1316 |
| 06A6 | F0 | 1317 |
| 06A7 | 03F0 | 1318 |
| 06A9 | F6AD | 1319 |
| 06AB | EBA5 | 1320 |
| 06AD | F0 | 1321 |
| 06AE | 02 | 1322 |
| 06AF | 8938 | 1323 |
| 06B1 | B800 | 1324 |
| 06B3 | E8B3 | 1325 |
| 06B5 | 99C7 | 1326 |
| 06B7 | C419 | 1327 |
| | | 1328 |

The invention claimed is:

1. A power servo system which includes an actuator adapted to variably position a load, means for receiving a state command signal, means for providing an error signal to control said actuator as a combined function of said state command signal and N dynamic state variable signals indicative of state conditions at said actuator and load, with N being an integer greater than one, and means reponsive to state conditions at said actuator and load for providing said N variable signals comprising:

sensor means responsive to said actuator and load for providing a first signal as a function of one dynamic state variable at said actuator; and observer means responsive to said first signal for estimating the remaining $N-1$ of said N dynamic state variable signals at said actuator and load as a function of a mathematical model of dynamic behavior at said actuator and load, said observer means comprising means for periodically sampling said error signal and said first signal, a plurality of adjustable means for selective adjustment as a function of said dynamic behavior at said actuator and load, and programmed digital computation means for selectively and periodically operating said sampling means, and responsive to the sampled error and first signals and to said adjustable means for estimating said $N-1$ dynamic state variable signals.

2. The power servo system set forth in claim 1 wherein said programmed digital computation means includes means for estimating said $N-1$ variable signals as a function of $N-1$ linear equations.

3. The power servo system set forth in claim 2 wherein said sensor means and said means providing said error signal provide said first signal and said error signal as respective d.c. signals, wherein said adjustable means comprises means for providing a plurality of d.c. signals as corresponding functions of said dynamic behavior, and wherein said observer means comprises analog-to-digital conversion means selectively responsive to said sensor means, said means providing said error signal and said adjustable means for providing corresponding digital signals to said programmed digital computation means.

4. The power servo system set forth in claim 3 wherein said analog-to-digital conversion means comprises comparator means for receiving said d.c. error signal, said d.c. first signal and said d.c. signals from said adjustable means, and for providing a digital output signal at a level indicative of a comparison between a corresponding said d.c. signal and a d.c. reference signal, means including a resistor ladder network responsive to preselected digital outputs from said programmed digital computation means for applying a said d.c. reference signal to said comparator means at a level corresponding to numerical value at said preselected digital outputs, and means for selectively varying said preselected digital outputs to said resistor ladder network while monitoring said output of said comparator means to set successive significant bits of each of said corresponding digital signals.

5. The power servo system set forth in claim 4 wherein said observer means further includes means for providing said $N-1$ variable signals as corresponding d.c. signals comprising digital-to-analog conversion means including said resistor ladder network and means for selectively applying digital representations of each of said $N-1$ signals to said preselected digital outputs connected to said resistor ladder network, and a plurality of $N-1$ sample-and-hold means coupled to said resistor ladder network and selectively operable by said programmed digital computation means.

6. The power servo system as set forth in claim 2 wherein said programmed digital computation means further includes means for periodically polling each of said adjustable means during operation of said observer means.

7. The power servo control system set forth in claim 2 wherein said actuator comprises an electro-hydraulic actuator, wherein said means for providing said error signal to said actuator is responsive to said state command signal and to dynamic variable signals indicative of position, velocity and acceleration at said actuator to provide said error signal to control motion at said actuator, said sensor means comprising means for providing a signal indicative of measured actuator position, said observer means comprising means responsive to said signal indicative of measured position to estimate velocity and acceleration at said actuator, and means for directing signals indicative of said estimated velocity and acceleration to said means for providing said error signal.

8. The servo control system set forth in claim 7 further comprising means for providing said signal indicative of measured actuator position to said means for controlling said actuator.

9. The servo control system set forth in claim 7 further comprising means for estimating actuator position as a combined function of said error signal and said signal indicative of measured position, and means for providing a signal indicative of estimated actuator position to said means for controlling said actuator.

10. The servo control system set forth in claim 7 wherein said means for periodically sampling said error signal includes signal delay means for simulating operational delays in said electro-hydraulic actuator.

11. The servo control system set forth in claim 7 wherein said adjustable means comprises operator-adjustable impedance means.

* * * * *